June 24, 1958 W. A. DREYER, JR., ET AL 2,840,276
FEEDING DEVICE
Filed Oct. 28, 1955 3 Sheets-Sheet 1

INVENTORS
WILLIAM A. DREYER, JR.
JOSEPH J. SELIGMAN
BY
Townsend, Townsend and Hoppe
ATTORNEYS June 24, 1958　　W. A. DREYER, JR., ET AL　　2,840,276
FEEDING DEVICE
Filed Oct. 28, 1955　　　　　　　　　　　　3 Sheets-Sheet 2
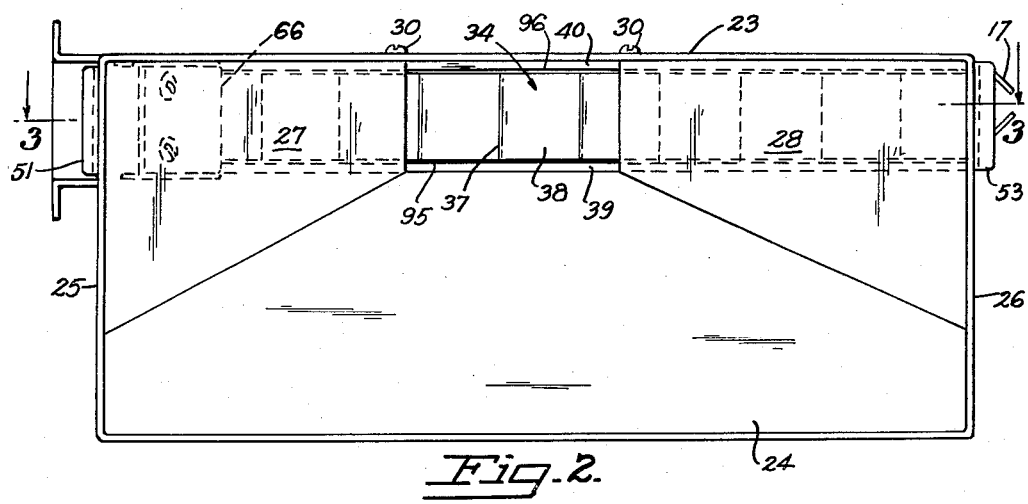
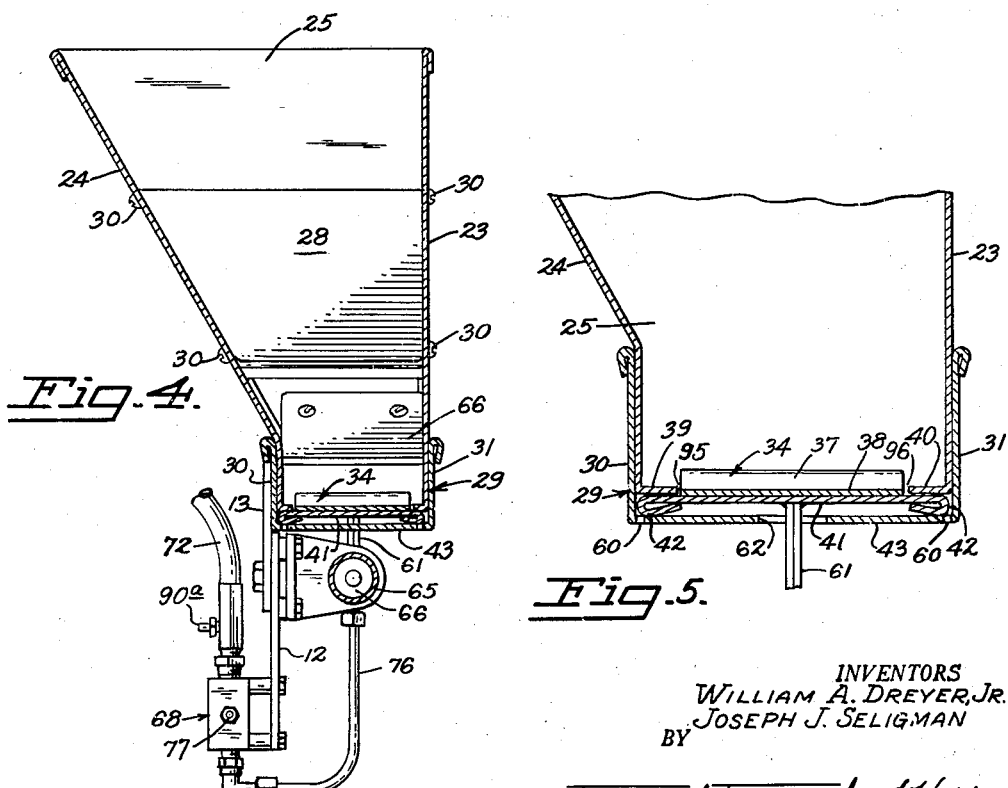
INVENTORS
WILLIAM A. DREYER, JR.
JOSEPH J. SELIGMAN
BY
Townsend, Townsend and Hoppe
ATTORNEYS June 24, 1958   W. A. DREYER, JR., ET AL   2,840,276
FEEDING DEVICE Filed Oct. 28, 1955   3 Sheets-Sheet 3

INVENTORS
WILLIAM A. DREYER, JR.
JOSEPH J. SELIGMAN
BY
Townsend, Townsend and Hoppe
ATTORNEYS United States Patent Office 2,840,276
Patented June 24, 1958

2,840,276

FEEDING DEVICE

William A. Dreyer, Jr., Piedmont, and Joseph J. Seligman, San Francisco, Calif.

Application October 28, 1955, Serial No. 543,444

8 Claims. (Cl. 222—185)

This invention relates to a hopper for dispensing small food particles at a regular rate of flow.

In the manufacture of ice cream products and the like, it is often desirable to feed quantities of hard to handle food such as marshmallow at a controlled rate of flow to ice cream processing machines. Such particles of food have in the past been found particularly difficult to handle due to the soft consistency of such foodstuffs, stickiness, and the small, irregular size of each food particle and successful feeding has been accomplished only by hand.

This invention provides a device having a food receiving hopper into which food particles may be placed at irregular intervals. The hopper is shaped to direct the said particles onto a food particle moving slide. A pneumatic drive system is employed to reciprocate the slide toward and away from a food feeding spout which is located at the particle feeding end of the device. Food particles are caused to move at constant rate of flow toward the particle feeding spout end of the hopper and out of the spout by shingle like members on the slide each of which have a relatively perpendicular face to push the particles toward the spout end with considerable force and a trailing face which offers only a negligible resistance due to its angular placement to the slide. By this arrangement, although the slide reciprocates in a forward and rearward direction, the members force the food particles only in the direction toward the said spout so that a constant rate of flow from the spout to food processing units, such as an ice cream maker is obtained.

The essence of this invention is to provide a food feeding and metering machine for hard to handle foods such as, for example, marshmallow pieces. The industry desires marshmallow pieces to feed in the form of separate discrete particles and wherein the particles are not clumped or compacted together by the feeding apparatus. A principal object of the invention is to provide such a machine.

Another object of the invention is to provide a food particle dispensing device having a reciprocating slide of shingle-shaped members which interact with food particles to effect a particle feeding operation in one direction.

A still further object of the invention is to provide a food feeding apparatus incorporating a means for disposing of undesired matter without impeding the feeding operation of the desired particles.

A further object is to provide a feeding mechanism for food particles which is controllable to increase or decrease the rate of feed at the will of the operator.

Another object is to provide a food feeding mechanism which is adjustable to feed foods having varying characteristics such as marshmallow particles, or fruit pieces in liquid syrup.

A still further object is to provide a food feeding machine which may be installed and operated at considerable savings in labor and with improved efficiency. Again the machine may be disassembled for purposes of cleaning and may be maintained in a sanitary condition.

Other objects and advantages of the invention will become apparent upon having reference to the following specification and accompanying drawings in which similar characters of reference designate corresponding parts in each of the drawings.

In the drawings:

Fig. 2 is a top plan view of Fig. 1;

Fig. 4 is a sectional view taken at line 4—4 of Fig. 1;

Fig. 5 is an enlarged sectional view taken at line 5—5 of Fig. 1;

Figures 1, 7:
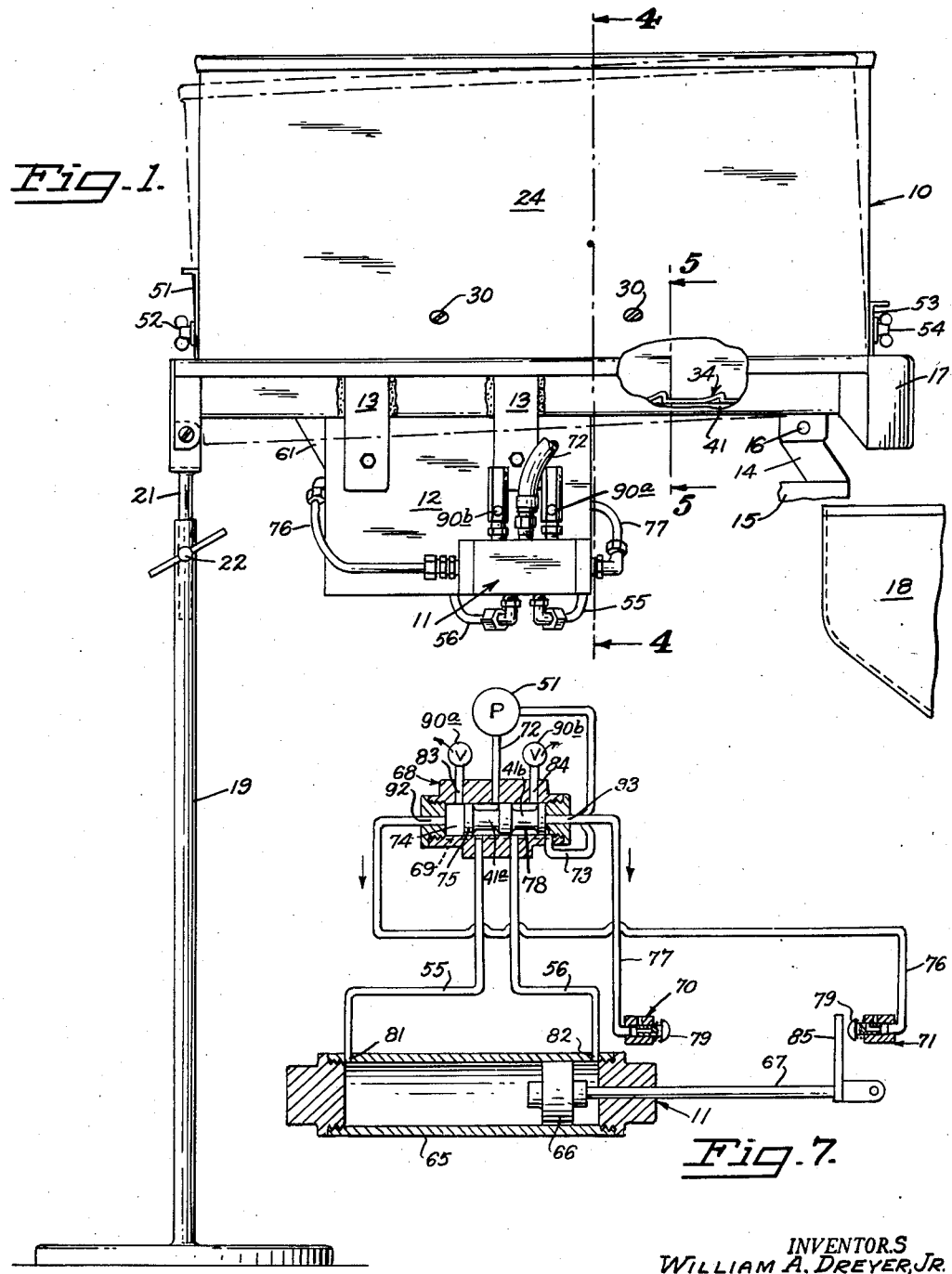
Fig. 1 is an elevational view of the invention with a partial cutaway section showing the position of the particle moving slide.
Fig. 7 is a schematic view partially in section depicting a pneumatic circuit to power the reciprocating slide.

Referring to Fig. 1, a marshmallow feeding device is provided with a body generally indicated by reference numeral 10 to receive and hold a quantity of marshmallow particles. Marshmallows are particularly difficult to feed and meter, while usually other foods such as nuts are comparatively simple to feed and meter. For this reason the invention is described herein with particular reference to the feeding of marshmallow particles. However, the device may be used in respect to feeding other food particles.

In association with the body 10 a pneumatic drive mechanism 11 is employed mounted to a mounting board 12 and suspended under body 10 by brackets 13 to provide the necessary power to drive the device. The hopper body is supported from a bracket 15 at the feed end of the body and by a standard 19 at the other end. Bracket 15 is mounted to some suitable base to support the invention and is provided with an arm 14 which interconnects with the body by a pivot pin 16 to form a hinge connection between the body and the bracket, allowing adjustment therebetween. Standard 19 is hollow and is provided with inner shaft 21, telescopically mounted therein to provide an extendable leg which may be used to raise or lower the rear end of body 10 and is held in place by a wing screw 22 so that the axis of body 10 may be varied to move food particles upwardly or downwardly, from the horizontal.

The feed end of body 10 is provided with a spout 17 through which food particles are dispensed to a food processing machine 18 such as for example an ice cream mixing container. The feeding device is arranged to dispense food particles stored in the body 10 at a consistent rate into machine 18.

Figure 3:
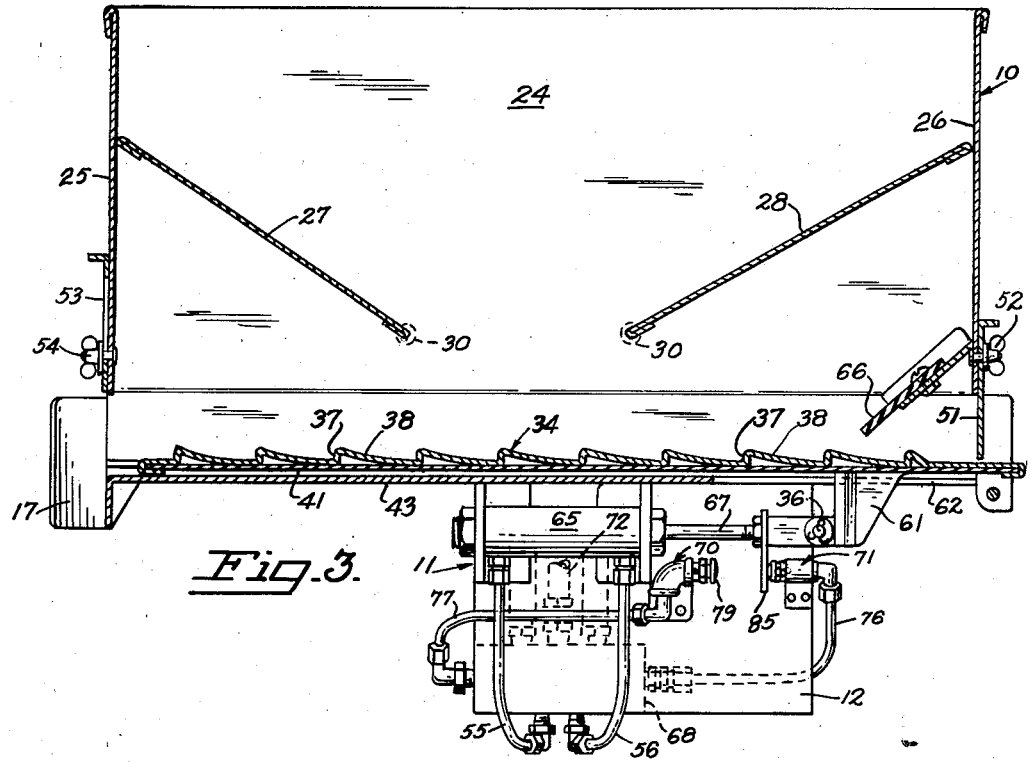
Fig. 3 is a sectional view of the invention taken at line 3—3 of Fig. 2.
Figure 6:
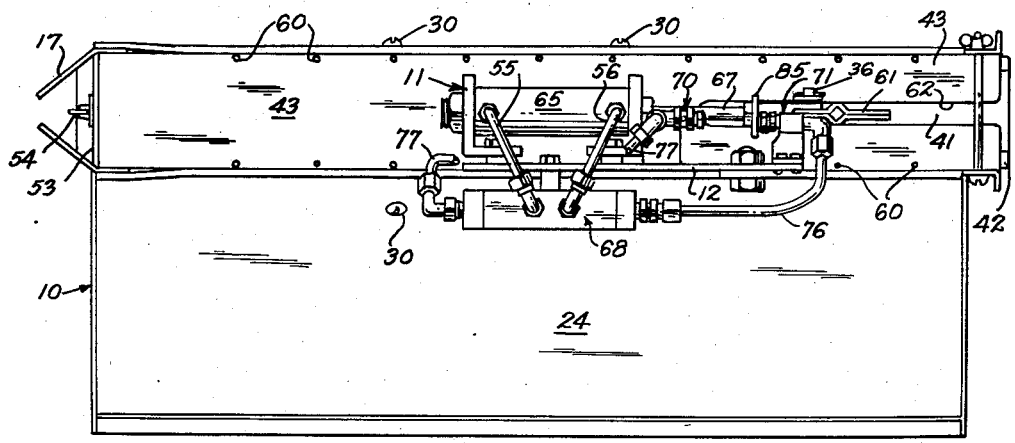
Fig. 6 is a bottom plan view of the invention.

Referring to Fig. 2 and Fig. 3, body 10 is defined by a substantially vertical rear wall 23, a front wall 24 which inclines inwardly from the top to the bottom of the body, and two vertical sides 25 and 26. Two baffles 27 and 28 are provided inside the body which rest against sides 25 and 26 and are held in place by screws 30 which connect the lower ends of the baffles to walls 23 and 24 so that the baffles may be removed to facilitate cleaning of the inside of the body, upon removal of screws 30. A funnel-shaped structure to guide particle flow which is defined on the sides by the top portion of sides 25 and 26, on the bottom portion by baffles 27 and 28, and on the front and rear by walls 24 and 23.

Referring now to Figs. 3, 4, and 5, two separated flanges or lips 39 and 40 are provided to extend inwardly from the bottom portion of front and rear walls 24 and 23 to form the top of a trackway which runs along the axis of body 10 and is generally indicated by the reference numeral 29. The bottom and sides of the track are defined by a bottom plate 43 and two panels, 30 and 31 which are mounted to the walls and support the bottom plate. A slide 41 is provided within the track with runners 42 formed by inward folds of the sides of the slide and engaging with bottom plate 43 and guided by panels 30 and 31 to allow the slide to move along the longitudinal axis of the body. The top or load bearing surface of slide 41 is provided with a row of shingle-like members 34 extending upwardly from slide 41 between flanges 39 and 40. Each member 34 has a substantially vertical or perpendicular face 37 which faces the front or feed end of the machine and a trailing portion 38 which inclines downwardly and rearwardly from its associated face 37. The shape of the members 34 is such that leading face 37 tends to push particles which rest thereon toward spout 17 during the forward stroke of the slide. Trailing portion 38 has a sufficiently inclined face so that only a slight rearward force or resistance against the charge on the slide is exerted on the rearward stroke. Thus, food particles resting on top of the load bearing surface of slide 41 are moved at regular intervals corresponding to the rate of reciprocation of the slide toward the front or feed end of the machine.

Slide 41 is made to reciprocate in track 29 by pneumatic mechanism 11. An arm 61 connected to mechanism 11 extends downwardly from slide 41 and is free to ride within a groove 62 provided within bottom plate 43 so that the slide may be moved longitudinally to the axis of body 10 with the arm extending downwardly below the bottom plate. Power from pneumatic mechanism 11 is transmitted to the slide via a drive shaft 67 which interconnects the mechanism and arm 61 by a removable bolt 36. The bolt is removable in order that slide 41 may be detached from mechanism 11 to allow the slide to be removed from the machine for cleaning.

Referring now to Fig. 7, pneumatic drive mechanism 11 generally has a power cylinder 65, an air pump 51, a master valve 68 to control air from the pump to the cylinder and two release valves 70 and 71 which in turn control the master valve. Power cylinder 65 is provided with a piston 66 connected to piston rod 67. A port 81 is provided opening into the rear of cylinder 65 and a port 82 is provided opening into the front of the cylinder in such a way that if air pressure is applied through port 82, the piston will be forced rearwardly and accordingly if pressure is applied through port 81 air pressure will force piston 66 forwardly. Valve 68 is arranged to supply air pressure either to port 81 or to port 82 with the remaining port acting as an exhaust outlet.

Master valve 68 is supplied with air from pump 51 via line 72 so that air flows into a cylinder 74 within the valve. Cylinder 74 has a valve actuating member 75 with two reduced diameter portions 41$^a$ and 41$^b$ arranged so that the member slides into one of two operating positions, front and backward.

Valve actuating member 75 in the forward position allows air from pump 51 to pass through reduced diameter portion 41$^a$ into a line 55 leading to port 81. When the valve actuating member is moved to the rear position the other reduced diameter portion 41$^b$ is arranged to allow air to pass from pump 51 to line 56 and into master cylinder 65 through port 82. Reduced diameter portions 41$^a$ and 41$^b$ are also arranged to exhaust air from ports 81 and 82 to exhaust ports 83 and 84 when opposing port 81 and 82 is supplied with air from pump 51. Port 83 is provided with an exhaust regulating or release valve 90$^a$ and port 84 is provided with a similar exhaust regulation valve 90$^b$, each of which is independently adjustable of the other.

Valve actuating member 75 is caused to go to the front or to the rear of cylinder 74, by release valves 70 and 71 which are arranged to release pressure from one or the other side of the member to cause it to move in the opposite direction. Line 73 interconnects pump 51 to a duct 69 which allows air to flow into the duct and into both sides of the member 75 with equal pressure. A port 92 is provided opening into the rear portion of cylinder 74 which is connected by a line 76 to release valve 71. The front of cylinder 74 is provided with a similar port 93 which is connected by a line 77 to release valve 70. The release valves are each provided with a spring biased button 79 which is connected to actuate a piston 78 having a duct which will allow air to escape from ports 92 and 93 through the respective valves upon depression of button 79. Thus, when button 79 of either valve is depressed an air escape vent is affected which lowers the pressure on the respective side of member 75 sufficiently so that the member is forced in the direction of the opened port.

In operation of the device when valve 70 is open member 75 is moved to the front portion of cylinder 74 causing air from pump 51 to be forced into port 81 to force piston 66 in the forward position. When valve 71 is depressed member 75 is forced in the opposite direction changing pressure from port 81 to 82 therein, causing piston 66 to be forced to the rear.

Buttons 79 of the valves are actuated by a stop 85 connected to shaft 67 so that when piston 66 has completed its forward stroke valve 71 is forced open thus changing the direction of air flow in cylinder 65 and causing piston 66 to reverse its travel until on the termination of the rearward stroke stop 85 coacts with button 79 of the valve 70, again causing a reversal of air pressure in cylinder 65.

The speed of each stroke is determined by the amount of exhaust ventage available through each valve 90. Therefore, if either valve 90$^a$ or 90$^b$ is fully opened, the pressure is released rapidly from the non-pressurized side of the piston 66. If, however, valve 90$^a$ or 90$^b$ is totally or partially restricted, the air pressure on the non-pressurized side of piston 66 resists movement of the piston until the pressure has been released from the non-pressurized side of cylinder 65. Thus, by independently adjusting either of the valves 90, the rate of the forward or rearward stroke may be adjusted. By this arrangement a fast forward stroke and a slow rearward stroke or the reverse may be obtained.

During the normal operation of the device, marshmallow particles or the like are placed into the top part of body 10 in suitable quantities at appropriate intervals. Baffles 27 and 28 restrict the flow of the particles in the body from falling onto track 29 in other than the central portions thereof and limit load weight on the load bearing surface of slide 41. When the device is put into operation, the pneumatic mechanism, as was hereinbefore described, causes slide 41 to reciprocate toward the front and rear end of track 29.

Shingle-like members 34 provide a constant forward movement of charges on slide 41 during the reciprocation of the slide which has the effect of forcing the marshmallow particles toward the feed end of body 10, out of the spout 17 and into food processing unit 18.

There is however, some small amount of rearward force exerted on the charge. Therefore, inside body 10 and adjacent the rear end of the slide and forward of side 26 a resilient arm 66 (Fig. 3) is arranged to bias food particles toward the particle feeding end of the body.

As backward pressure is built up against arm 66, the resiliency thereof builds an increasing pressure in the forward direction, which in combination with the overall forward force exerted from the interaction of slide 41 and the food particles, causes the particles in the rear portion of the device to be forced in the forward direction.

During operation the flow of particles through spout 17 is at a regular rate. The rate of flow however may be increased or decreased in accordance with the rate of speed of reciprocation. Thus if the speed of reciprocation is increased the feed will increase accordingly. Similarly, if the feed stroke is increased and the speed of the back or backward stroke is decreased, or vice versa, the feed flow may be thus adjusted to suit the requirements of the operator dependent upon material being fed and other operating conditions.

A gate 51 is provided to cover the front and feed end opening of the body. Gate 51 is locked by a wing nut 52, so that gate 51 may be locked into position to either completely or substantially restrict the size of the opening.

This arrangement allows the particle flow to be substantially decreased in accordance with the decrease of the opening through which the particles may flow. A rear opening is also provided and is covered by a gate 53 which is adjustably supported by a wing nut 54 to enable the gate to be raised or lowered to effect complete or partial closure of the rear opening.

Referring particularly to Fig. 5, it often occurs in the dispensing of food particles, such as marshmallows that small particles of dust or sugar powder, in addition to the marshmallow particles themselves, are carried onto slide 41. Such small waste segments are not desirable in many cases and means is provided to eliminate the same.

A space 95 is provided between flange 39 and slide 41 and a similar gap 96 is provided between the slide and the flange 40. Through these gaps 95 and 96 powder and the like will fall down onto bottom plate 43. The bottom plate is provided with two rows of waste elimination apertures 60 on the outer edges which allow powder falling through gaps 95 and 96 to be eliminated. Liquid waste can also be eliminated in a like manner.

Referring to Fig. 1, when the rear end of hopper 10 is lowered by depressing shaft 21 into leg 19, slide 41 is oriented in an uphill direction toward the feed end of the body. Slide 41 has sufficient forward particle moving force to move the particles in the uphill direction in order that they will be dispensed through spout 17.

The device may be used to feed fruit particles contained in a liquid syrup wherein the solid particles are to be fed to a mixing machine without the liquid. With slide 41 orientated in an uphill direction the liquid will be gravity induced in a downhill direction along flanges 39 and 40 toward the rear of body 10 and out through gate or closure 53. Thus the solid particles will travel uphill in accordance with the force exerted by the slide 41 and the liquid will flow down the bottom of the body to be dispensed from the rear.

Similarly, the slide may be inclined downwardly for certain food feeding operations dictated by the nature of the material and the desires of the operator. The device thus has inherent flexibility in that speeds may be controlled through the adjustment of valves 90ª and 90ᵇ to effectuate a change of speed in either the forward or rearward stroke or both. The direction of travel of food particles may be directed in either an uphill, horizontal, or a downhill direction. As a further control of the device, gates 51 and 53 provide an easily accessible mechanism by which flow rate may be restricted.

Although the foregoing invention has been described in some detail by way of illustration and example for purposes of clarity of understanding, it is understood that certain changes and modifications may be practiced within the spirit of the invention and scope of the appended claims.

What is claimed is:

1. A food dispensing device comprising a hopper body, means disposed on the feed end of said body to feed material therefrom, a slide having a load bearing surface to receive material from said hopper body slidably mounted on the underside thereof, slide moving means for alternately moving said slide toward and away from said feed end, first adjustable means for regulating the speed of said slide movement toward said feed end, second adjustable means for regulating the speed of said slide movement away from said feed end, said first and second means adjustable independently of one another, and baffle members disposed internally of said body and above said slide to direct material in said body to a predetermined locus of the load bearing surface of said slide.

2. A food dispensing device comprising a hopper body, spout means disposed on the feed end of said body, a slide having a load bearing surface to receive material from said hopper body slidably mounted on the underside thereof, slide moving means for alternately moving said slide toward and away from said feed end, first adjustable means for said slide moving means to control the speed said slide moves toward said feed end, second adjustable means for said slide moving means to control the speed said slide moves away from said feed end, said first and second means adjustable independently of one another, overlapping shingle-like members on the load bearing surface of said slide, the butt ends of which face the feed end of the body, and baffle members disposed interiorly of said body and above said slide to direct material in said body to a locus of the load bearing surface of said slide.

3. A food dispensing device comprising a hopper body, spout means disposed on the feed end of said body, a slide having a load bearing surface to receive material from said hopper body slidably mounted on the underside of said body, slide moving means for alternately moving said slide toward and away from said feed end, first adjustable means for said slide moving means to control the speed said slide moves toward said feed end, second adjustable means for said slide moving means to control the speed said slide moves away from said feed end, said first and second means operable independently of one another, overlapping shingle-like members on the load bearing surface of said slide, the butt ends of which face the feed end of the body, baffle members supported by said body above said slide to direct material in said body to a locus of the load bearing surface of said slide approximately midway between the ends thereof, and means mounted on one end of said body opposite said feed end and above said slide and arranged to urge material on said slide toward said feed end.

4. A food dispensing device according to claim 3 and provided with support members for supporting said body, and means for adjusting at least one said member for raising and lowering one end of said body.

5. A food dispensing device comprising: a hopper body, a spout disposed at the feed end of said body, an adjustable gate to limit the flow of material through said spout, a waste elimination opening means on the end of said body opposite said feed end, an adjustable gate to limit the size of said waste elimination opening, a slide having a load bearing surface to receive material from said hopper slidably mounted on the underside of and along the longitudinal axis of said body, means for alternately moving said slide toward and away from said feed end, overlapping shingle-like members disposed on the load bearing surface of said slide to carry material toward said feed end, baffle members supported by said body over said slide to direct material in said body onto the load bearing surface of said slide approximately midway between the ends thereof, support members for supporting said body, and means for adjusting at least one of said members for raising and lowering one end of said body to adjust the angle of material flow toward said feed end.

6. A food dispensing device comprising: a hopper body, spout means disposed at the feed end of said body, a slide slidably mounted on the underside of said body, slide moving means for alternately moving said slide towards and away from said feed end, said slide moving means actuated by air under pressure, a source of air under pressure, control valve means to control the direction of movement of said slide moving means, stop actuated release valve means to control said control valve in accordance with stroke limits of said slide moving means, a pair of independently adjustable exhaust valves for said slide moving means to limit exhaust flow therefrom during the forward and rearward stroke whereby the speed of forward and rearward travel are independently variable in accordance with said exhaust valve opening.

7. A food dispensing device comprising: a food receiving hopper body having a feed end and a waste elimination end, a dispensing opening disposed at the feed end of said body, a waste elimination opening disposed on the waste elimination end of said body, a first adjustable gate for said dispensing opening to limit the opening thereof, a second adjustable gate for said waste elimination opening to limit the opening thereof, a slide having a load bearing surface to receive material from said hopper slidably mounted along the longitudinal axis of the underside of said body between the feed end and the waste elimination end of said body, a pair of flange members disposed along the longitudinal axis between said slide and said body on approximately a common plane with said slide, pneumatic means for alternately moving said slide toward and away from said feed end, valve means for said pneumatic means to control the direction of travel of said slide, a stop carried by said pneumatic means to reverse said valve means when said pneumatic means reaches a stroke limit, first adjustable means limiting exhaust flow from said pneumatic means to control speed of said slide toward the feed end of said body, second adjustable means limiting the exhaust flow from said pneumatic means to control speed of said slide away from the feed end of said body, said first and second adjustable means arranged to control the slide speed in one direction independently of the other, overlapping shinglelike members on the load bearing surface of said slide, each said member having butts disposed to carry material toward said feed end, baffle members removably supported by said body above said slide to direct material in said body onto the load bearing surface of said slide approximately midway between the ends thereof, and resilient means on the waste elimination end of said body above said slide arranged to urge material on said slide toward said feed end.

8. A food dispensing device according to claim 7 and provided with means for adjustably raising and lowering the waste elimination end of said body to adjust the angle of incline of the longitudinal axis of said slide.

References Cited in the file of this patent

UNITED STATES PATENTS

| | | |
|---|---|---|
| 146,251 | Hardwick | Jan. 6, 1874 |
| 277,666 | Blake | May 15, 1883 |
| 409,329 | McAnulty | Aug. 20, 1889 |
| 885,951 | Post | Apr. 28, 1908 |
| 1,880,287 | Sifton | Oct. 4, 1932 |